United States Patent
Gupta

(10) Patent No.: US 11,182,773 B1
(45) Date of Patent: *Nov. 23, 2021

(54) PAYMENT USING A SMART CARD AND IDENTIFICATION FROM THE CLOUD

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,923

(22) Filed: Mar. 25, 2021

Related U.S. Application Data

(63) Continuation of application No. 17/060,123, filed on Oct. 1, 2020, now Pat. No. 10,990,961.

(51) Int. Cl.
*G06Q 20/34* (2012.01)

(52) U.S. Cl.
CPC ......... *G06Q 20/341* (2013.01); *G06Q 20/352* (2013.01); *G06Q 20/353* (2013.01); *G06Q 20/3552* (2013.01)

(58) Field of Classification Search
None
See application file for complete search history.

(56) References Cited

U.S. PATENT DOCUMENTS

| 10,554,411 B1 | 2/2020 | Ashfield et al. |
| 10,990,961 B1 * | 4/2021 | Gupta .................. G06Q 20/353 |
| 2016/0267486 A1 | 9/2016 | Mitra et al. |
| 2019/0286805 A1 | 9/2019 | Law et al. |

* cited by examiner

*Primary Examiner* — Kristy A Haupt
(74) *Attorney, Agent, or Firm* — Weiss & Arons LLP; Michael A. Springs, Esq.

(57) ABSTRACT

Systems and methods for payment using smart payment cards and identifying a payment recipient's financial institution through cloud-based applications are provided. The systems and methods may include a smart payment card including a touchscreen and internet connectivity capabilities. The smart payment card, after authenticating a user, may connect to a cloud-based application and determine, for a recipient chosen by the user, the recipient's bank account information. The smart payment card, after approval from the user, may then direct a payment to the recipient.

20 Claims, 7 Drawing Sheets

PAYMENT USING A SMART CARD AND IDENTIFICATION FROM THE CLOUD

CROSS REFERENCE TO RELATED APPLICATION

This application is a continuation of Ser. No. 17/060,123, filed on Oct. 1, 2020 and entitled PAYMENT USING A SMART CARD AND IDENTIFICATION FROM THE CLOUD, which is hereby incorporated by reference herein in its entirety.

FIELD OF TECHNOLOGY

This disclosure relates to systems and methods for payment using smart cards and information retained in the cloud.

BACKGROUND

Millions, if not billions, of times per day, consumers purchase goods and services using credit and debit cards. Current credit and debit cards may be considered "non-smart" in that they simply store personal information that is then read by a reader.

The current process of using "non-smart" credit and debit cards often relies on someone other than the consumer entering information such as a payment amount (which may be false or mistaken), and may be hackable. Current credit and debit cards rely on point-of-sale ("POS") devices to read the information stored on the card and initiate and complete a transaction. POS devices may be expensive, may be prone to breaking, may be unsanitary (as thousands of users may touch the device in a single day), and may provide an unsatisfactory user experience.

In addition, consumers may be able to use credit and debit cards online, but to do so the consumer needs access to a smartphone or a computer (such as a laptop). This extra device, in addition to the credit or debit card, may also be a point of failure or vulnerability.

Further, many companies utilize enterprise-level financial applications to perform accounting, auditing, invoice-tracking, billing, expense tracking, and payment functions, among other functions. Individuals may also have access to some or all of these functions through consumer-level financial applications.

As a result, it would be desirable to provide systems and methods for a "smart" payment card that may avoid some or all of the issues associated with current credit and debit cards described above. A "smart" payment card may be able to connect to the internet and direct a payment through the internet and avoid POS devices, smartphones, and other computers entirely. In addition, little, if any, additional personal information need be permanently stored on the "smart" card and the required information and identification may be stored in the cloud.

Further, limiting smart payment cards to connect to only one or more specific cloud-based applications and/or limiting the smart payment card to making specific pre-approved payments may assist a company or individual in: expense tracking, regulating payments, payment authorizations, making faster payments to vendors or suppliers, and reducing fraud in expenses, among other benefits.

SUMMARY OF THE DISCLOSURE

It is an object of this disclosure to provide systems and methods for payment using a smart payment card and recipient identification through the cloud.

A smart payment card having a thickness not greater than 0.8 millimeters ("mm") and a surface area not greater than 86 mm×54 mm is provided. The smart payment card may have a substantially rectangular housing with a right edge, a left edge, a top edge, a bottom edge, a front face, a back face, as well as a thickness. Any corners may be square or rounded. The housing may include a microprocessor, non-transitory memory such as random-access memory and/or read-only memory, a network interface card/controller ("NIC"), an input/output module, at least one visible screen, a display controller, at least one antenna, an electrical contact, a battery, and an operating system stored in the non-transitory memory. The physical components may be powered by the battery and electronically coupled to the microprocessor and/or each other. The smart payment card may also include at least one payment application stored in the non-transitory memory. This payment application may be configured to access a cloud-based application containing a phonebook/contact list which contains at least one contact. The payment application and/or cloud-based application may be able to determine via a communication with a cloud-based information source a contact's bank account information. The payment application and/or cloud-based application may be able to instruct a financial institution associated with the user/owner of the smart payment card to direct a monetary payment to said contact.

In an embodiment, the screen is a touchscreen. A touchscreen may enable a user/owner to input information and instructions to the smart payment card and/or any applications running on the smart payment card. In some embodiments the screen or touchscreen may be substantially the same size as the housing. In other embodiments, the screen or touchscreen may be an electroluminescent display (ELD), e-ink display, liquid crystal display ("LCD"), light emitting diode ("LED") display, organic LED ("OLED") display, active-matrix OLED ("AMOLED") display, microLED, quantum dot ("QLED") display, or any other suitable type of display. The screen may be monochrome or color-capable. A monochrome screen may draw less power.

In an embodiment, the smart payment may also include a biometric scanner to authenticate the identity of the user/owner. The biometric scanner may be located within the housing, powered by the battery, and electronically coupled to the microprocessor.

In some embodiments, the antenna may be Bluetooth antenna, a cellular antenna, and/or a wi-fi antenna. Other types of antennae may be appropriate as well.

In an embodiment, the smart payment may also include a Near Field Communication ("NFC") chip powered by the battery and/or an external source and electronically coupled to at least the microprocessor.

In some embodiments, the smart payment card's microprocessor has a thickness between 0.0001 mm and 0.25 mm. Thinner microprocessors may require less power from the battery. As microprocessor technology improves, the microprocessor in a smart payment card may become thinner, smaller, less power hungry, and/or more powerful for a given size.

In some embodiments, the smart payment card may include a keypad accessible to a user. This keypad may be in place of or in addition to the LED screen. The keypad may be a full alphabetic keypad, a full alphanumeric keypad, or a numeric keypad.

In an embodiment, the smart payment card may also include a microphone and/or a speaker. The microphone and/or speaker may enable audio interaction with the smart payment card.

In an embodiment, the smart payment card may also include an encryption controller. The encryption controller may allow for accurately authenticating the user/owner, as well as protecting the user/owner, any payment recipient, and financial institutions from hacking and/or fraud. In an embodiment, the non-transitory memory on the smart payment card may include executable instructions and at least one datum configured to authenticate the user. These instructions and data may work in concert with, or separate from, any encryption controller.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
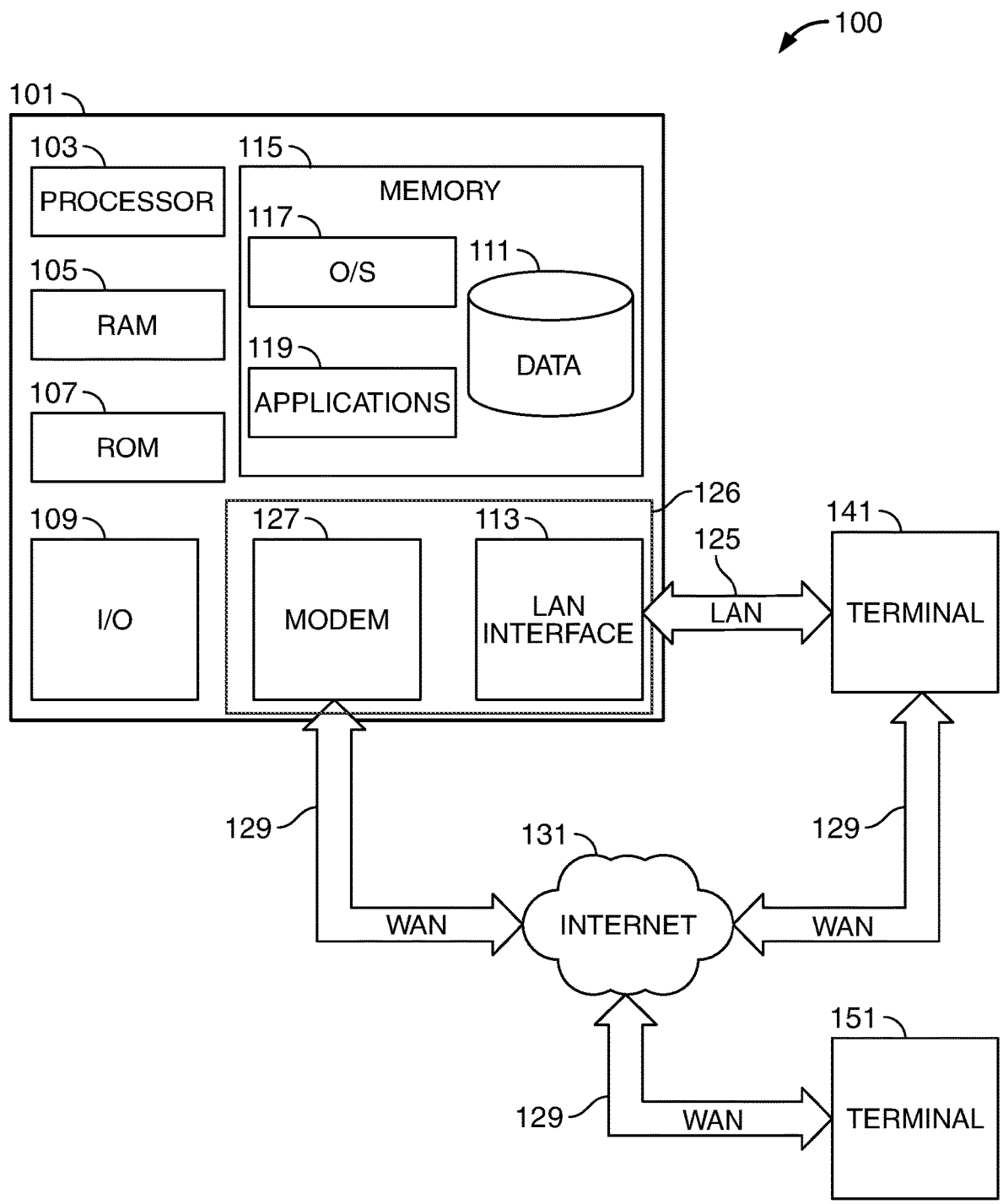
FIG. 1 shows an illustrative system in accordance with the principles of the disclosure.

Systems and methods for a smart payment card are provided.

A smart payment card having a thickness not greater than 0.8 millimeters ("mm") and a surface area not greater than 86 mm×54 mm is provided. The smart payment card may have a substantially rectangular housing with a right edge, a left edge, a top edge, a bottom edge, a front face, and a back face, as well as a thickness. The housing may consist of metal, plastic, wood, other suitable materials, or a combination thereof. The thinner the walls of the housing are, the more internal space there may be for internal components to be embedded inside the housing. It may not be necessary for the housing to be separate from the components as the housing may be formed via an extrusion or printing process around any internal or embedded components.

The housing may provide a protective layer for internal components of the smart payment card. The housing may be flexible. The housing may define a form factor of the smart payment card. For example, illustrative form factors are defined in specifications published by the International Organization for Standardization. Illustrative specifications may include: ISO/IEC 7810, ISO/IEC 7811 and ISO/IEC 7816, which are hereby incorporated herein by reference in their respective entireties. The housing of the smart payment card may conform to the predefined form factor. For example, the housing and a keypad mounted on an outside of the housing may have a thickness that is not greater than 0.8 mm and a surface area that is not greater than 86 mm×54 mm.

Embedded within the housing may be a microprocessor, random-access memory, read-only memory and other non-transitory memory, a network interface card/controller ("NIC"), an input/output module, at least one visible screen, a display controller, at least one antenna, an electrical contact, a battery, and an operating system stored in the non-transitory memory. The physical components may be powered by the battery and electronically coupled to the microprocessor and/or each other. The smart payment card may also include at least one payment application stored in the non-transitory memory.

In an embodiment, the payment application is not stored on the smart payment card. Rather, the payment application may be a cloud-based application and the smart payment card may only contain instructions on how to reach and interact with that specific cloud-based application or other cloud-based applications. This embodiment may be referred to as a smart limited transaction card. The cloud-based payment application may be linked to, or a part of, enterprise or consumer-level financial applications. The cloud-based payment application may have pre-loaded and pre-approved invoices, bills, vendors, and/or services. The smart limited transaction card may be limited to only work with the pre-loaded and/or pre-approved invoices, bills, vendors, and services on the cloud-based payment application. This embodiment may be simpler and easier to use, may ease the ability to track expenses (e.g., if the card can only be used at one hotel chain and one restaurant chain), and may have the ability to prevent the misuse of the smart limited payment card, preventing fraud. This embodiment may also provide for faster payment of invoices and bills.

A payment application may be configured to access a cloud-based application containing a phonebook/contact list which contains at least one contact. The payment application and/or cloud-based application may be able to determine via a communication with a cloud-based information source a contact's bank account information. The payment application and/or cloud-based application may be able to instruct a financial institution associated with the user/owner of the smart payment card to direct a monetary payment to a recipient from the contact list.

In some embodiments, the screen may be on the front face or back face of the housing. The screen may replace a portion of the housing. The housing may include a cover for the screen. The cover may be moveable.

In an embodiment, the screen is a touchscreen. Any type of touchscreen that will fit within the confines of the housing may be appropriate. A touchscreen may enable a user/owner to input information and instructions to the smart payment card and/or any applications running on the smart payment card. In some embodiments the screen or touchscreen may be substantially the same size as the housing. In other embodiments, the screen or touchscreen may be an LED screen, an electroluminescent display (ELD), e-ink display, LCD, LED, OLED, AMOLED, microLED, QLED, or any other suitable type of display.

In an embodiment, the smart payment may also include a biometric scanner to authenticate the identity of the user/owner. The biometric scanner may be located within the housing, powered by the battery, and electronically coupled to the microprocessor. The biometric scanner may be a fingerprint reader. Other types of biometric identifying information (e.g., a retinal scan) may be appropriate when the relevant hardware fits within the housing. For example, in an embodiment, a voiceprint may be an appropriate biometric marker, and the smart payment card may include a microphone and/or speaker to enable a voiceprint biometric scan.

In some embodiments, the antenna may be Bluetooth antenna, a cellular antenna, and/or a wi-fi antenna. Other types of antennae may be appropriate as well. Each antenna may be configured to connect to the internet via a network controller and/or an NIC.

In an embodiment, the smart payment may also include a Near Field Communication ("NFC") chip powered by the battery and/or an external source and electronically coupled to at least the microprocessor. The NFC chip may be able to communicate with other NFC chips as well as a network controller.

In some embodiments, the smart payment card's microprocessor has a thickness between 0.0001 mm and 0.25 mm. Smaller microprocessors may require less power from the battery. As microprocessor technology improves, the microprocessor in a smart payment card may become smaller, less power hungry, and/or more powerful for a given size.

In some embodiments, the smart payment card may include a keypad accessible to a user. This keypad may be in place of or in addition to the LED screen. The keypad may be a full alphabetic keypad, a full alphanumeric keypad, or a numeric keypad. A numeric keypad may have the capability of inputting alphabetic characters. In an embodiment, an external keypad may be electronically coupled to the smart payment card, through a wire or wirelessly (e.g., through Bluetooth or other suitable wireless communication channel). In an embodiment, an external keypad may be a portion of a sleeve or cover for the smart payment card.

In an embodiment, the smart payment card may also include a microphone and/or a speaker. The microphone and/or speaker may enable audio interaction with the smart payment card. This audio interaction may enable voice control of the functions of the smart payment card, as well as voice authentication of the owner/user.

In an embodiment, the smart payment card may also include one or more cameras. The camera may enable visual authentication of the owner/user, as well as confirmation for any instructions provided by the owner/user.

In an embodiment, the smart payment card may also include an encryption controller. The encryption controller may allow for accurately authenticating the user/owner, as well as protecting the user/owner, any payment recipient, and financial institutions from hacking and/or fraud. In an embodiment, the non-transitory memory on the smart payment card may include executable instructions and at least one datum configured to authenticate the user. These instructions and data may work in concert with, or separate from, any encryption controller.

In an embodiment, the smart payment card may include an accelerometer and/or a gyroscope electronically coupled to the microprocessor and powered by the battery. The accelerometer and/or gyroscope may be used to determine the proper orientation of the screen or touchscreen. In addition, they may be used to activate the smart payment card through a particular gesture (e.g., shaking the card twice, or flipping the card three times). Data received from the accelerometer and/or gyroscope may also be used in securing the smart payment card as, for example, a particular gesture known only to the owner/user of the card may be set and used as one method of authentication. Particular gestures utilizing the accelerometer and/or gyroscope may also correspond to particular actions, such as, for example, scrolling through a list on an LED screen or touchscreen, or choosing yes or no when prompted. Using gestures may be safer and more convenient, especially for owners/users who are unable to properly interact with a touchscreen or keypad due to the size of the smart payment card. Particular gestures may be pre-installed onto the smart payment card, or they may be installed or learned at a different time (e.g., when an owner/user decides to activate gestures).

A method of using a smart payment card to make a payment using internet-based information is provided. The smart payment card may have some or all of the components described in this disclosure.

The method may include the step of the smart payment card receiving an activation signal. This activation signal can be, for example, a particular gesture such as shaking the card, touching the screen, pressing an activation button, speaking a particular phrase, and/or any other activation signal, such as, for example, an electro-magnetic signal or radio-frequency signal.

Further steps may include: connecting the smart payment card to the internet and receiving login credentials from a user such as the owner. The login may be to a cloud-based account or cloud-based application and may enable a download from the cloud-based account or application. The download may include at least a contact list of registered contacts. This contact list may be in the form of a phonebook. It is expected that a user/owner will set up this contact list before using the smart payment card. However, it may be possible for a user/owner to add to the contact list while using the smart payment card. For example, if a user/owner desires to purchase an item in a retail store that is not in the contact list, the owner/user may be able to add the retail store to the contact list.

In some embodiments, this can be accomplished by waving the card over a QR code associated with the item or with the retail store.

Further steps may include authenticating the user, downloading all or a portion of the contact list onto the smart payment card from the cloud-based application, prompting the user to select a recipient from the contact list, prompting the user to select a payment amount and receiving the payment amount from the user, determining the recipient's bank account information, communicating with the user's financial institution, approving and verifying the payment amount, sending the payment amount to the recipient's bank account, logging the payment amount and recipient, and erasing the contact list, payment amount, and recipient from the smart payment card. These steps may enable the user to select and pay a recipient entirely through the smart payment card, thereby avoiding POS devices as well as larger computers (such as a smartphone, laptop, or desktop computer).

In some embodiments, the smart payment card may connect to the internet through cellular data, through wi-fi, through Bluetooth, and/or through any other appropriate connections.

In other embodiments, instead of downloading all or a portion of the contact list onto the smart payment card and into its memory, the cloud-based application may stream all or a portion of the contact list to the smart payment card. Streaming may be advantageous as less memory is necessary on the smart payment card, as when a file is streamed the whole file is not stored onto memory, unlike downloading.

In some embodiments, the smart payment card may include a microprocessor. The smart payment card may include various other components, such as a battery, a speaker, and antennas. The microprocessor may have a thickness that is not greater than 0.25 millimeters ("mm"). The microprocessor may control overall operation of the smart payment card and its associated components. The smart payment card may include RAM, ROM, or other non-transitory or non-volatile memory, an input/output ("I/O") module.

In some embodiments, the I/O module may include a microphone and/or touch screen which may accept user-provided input. The I/O module may include one or more speakers for providing audio output and a display for providing textual, audio-visual and/or graphical output.

Software may be stored within the non-transitory memory and/or other storage media. The software may provide instructions to the microprocessor for enabling the smart payment card to perform various functions. For example, the non-transitory memory may store software used by the smart payment card, such as an operating system, application programs, web browser and a database. Alternatively, some or all of computer executable instructions of the smart payment card may be embodied in hardware or firmware components of the smart payment card.

Application programs, which may be used by the smart payment card, may include computer executable instructions for invoking user functionality related to communication, authentication services, and voice input and speech recognition applications. Application programs may utilize one or more algorithms that interact with the cloud, encrypt information, process received executable instructions, interact with an ATM, perform power management routines or other suitable tasks.

For example, to access a cloud program, a user may log in to a machine, such as a smart payment card according to the disclosure, that includes an internet connection and a limited function web browser or other web-access application.

The cloud interface and all the functionality, including data storage, can be delivered from remote servers. In some embodiments, the cloud interface can form part of the wireless interface described above. Preferably a user can use cloud application servers to host different cloud apps. The current disclosure contemplates leveraging one or more cloud apps to procure information relating to payment. The payment information preferably relates to accounts associated with the phone numbers in a contact list provided by a user or a search engine.

The smart payment card may include a pressure sensitive button. The pressure sensitive button may have a thickness that is not greater than 0.8 mm. The pressure sensitive button may be actuated by a user to activate the smart payment card. For example, actuating the pressure sensitive button may activate the microprocessor or cloud-interaction-device interface of the smart payment card.

In some embodiments, the smart payment card may be activated in response to receiving high frequency wireless signals. The high frequency signals may provide power to one or more components of the smart payment card. In response to receiving the power, the microprocessor may be activated and begin to draw power from a battery on the smart payment card.

In an embodiment, the smart payment card may include one or more electrical contacts. An electrical contact may be constructed using any suitable material that conducts or transfers electricity. An electrical contact may be accessible on any suitable face of a housing of the smart payment card. The contact may be accessible through a thickness of the housing. The contact may be utilized to transfer electrical charge to the rechargeable battery.

In order to interact with the cloud, the card may include a NIC. The NIC may include software and/or hardware for establishing a wireless communication channel. Such protocol may include Wi-Fi, Bluetooth, Ethernet, NFC, and cellular telecommunications. Wi-Fi may include passive Wi-Fi with lower power consumption than typical Wi-Fi. The smart payment card may be configured to communicate using a typical Wi-Fi range such as 150-300 ft. when searching for an available wireless communication channel such as a wireless communication channel for communications with the cloud.

In an embodiment, the wireless interface may include a NFC chip. The NFC chip may communicate over a typical NFC range (~2 in.) when transmitting or receiving sensitive data. A microprocessor or the smart payment card may be configured to dynamically limit or expand transmitting and receiving ranges. The microprocessor may dynamically limit or expand transmitting and receiving ranges in response to a detected location of the smart payment card.

For example, the microprocessor may expand a communication range when the smart payment card is within a "familiar" zone. A familiar zone may be a pre-defined radius of a owner/user's home or work location. The microprocessor may limit a communication range when the smart payment card is within an "unknown" zone. For example, the microprocessor may limit a communication range when the customer is travelling. The microprocessor may restrict the smart payment card to using NFC communication when in an unknown zone.

The smart payment card may include an electrical contact that may be used to establish a wired or contact based connection. For example, the smart payment card may include an EMV (i.e., "Europay, Mastercard, and Visa") chip. The EMV chip may function as an electrical contact. The EMV chip may include software and/or hardware for establishing a wired communication channel. The battery of the smart payment card may be recharged via the at least one electrical contact when the smart payment card is in contact with another device (e.g., via the EMV chip). The electrical contact may also allow for wireless charging.

As described above, the smart payment card may include a microprocessor. The microprocessor may be embedded in and protected by a housing. The smart payment card may include non-transitory memory locations within the housing. The microprocessor may access such memory locations. The non-transitory memory may be included in the microprocessor.

The non-transitory memory locations may store instructions, that, when executed by the microprocessor, cause the smart card to perform various functions.

The smart payment card may include a battery for powering the cloud-interaction device interface and the microprocessor. In an embodiment, the smart payment card may include a keypad. The keypad may be mounted on an outside of the housing. smart payment card. The keypad may preferably not increase the form factor of the smart payment card.

An owner/user of the smart payment card may enter data using the keypad. The data entered by the user may be captured by the microprocessor.

Authentication information may be captured, encrypted and/or stored on the smart payment card. When the smart payment card establishes a communication channel with a device at a remote location, the smart payment card may present the authentication information to the cloud-interacting device without requiring any further prompting or input from the user.

Other illustrative data that may be entered via the keypad may include a user's name, an expiration date of the smart payment card, an amount, a currency, a card verification value ("CVV"), a PIN, or any other suitable data. The user may enter information such as a telephone number, address or zip code. Such information may be used to authenticate the user. In some embodiments, the user may download information from a digital phonebook/contact list stored remotely from the card.

The smart payment card may include executable instructions. The executable instructions may be stored in non-transitory memory. The executable instructions, when run by the microprocessor, may implement various functions of the smart payment card. The instructions may capture data entered using the keypad. The executable instructions may encrypt the captured data. The smart payment card may include a dedicated encryption controller for performing the encryption. The executable instructions may store the encrypted data locally on the smart payment card.

A keypad of the smart payment card may have an active state and an inactive state. In the inactive state, the keypad may not capture data inputs entered using the keypad. For example, in the inactive state, the microprocessor may not supply power to the keypad. In the inactive state, the microprocessor and associated executable instructions may disregard data inputs entered using the keypad.

In the active state, the capture data inputs entered by the user using the keypad may be captured and stored locally on the smart payment card. In the active state, the microprocessor may supply power to the keypad. In the active state, the microprocessor and associated executable instructions may capture and/or encrypt data entered or selected using the keypad.

The inactive state of the keypad may be a default state. When the keypad is in the inactive state, data entered using the keypad is not captured by the microprocessor or stored locally on the smart payment card. The microprocessor may toggle the keypad between the inactive and active states.

A touchscreen of the smart payment card may have an active state and an inactive state. In the inactive state, the touchscreen may not capture data inputs entered using the touchscreen. For example, in the inactive state, the microprocessor may not supply power to the touchscreen. In the inactive state, the microprocessor and associated executable instructions may disregard data inputs entered using the touchscreen.

In the active state, the capture data inputs entered by the user using the touchscreen may be captured and stored locally on the smart payment card. In the active state, the microprocessor may supply power to the touchscreen. In the active state, the microprocessor and associated executable instructions may capture and/or encrypt data entered or selected using the touchscreen.

The inactive state of the touchscreen may be a default state. When the touchscreen is in the inactive state, data entered using the touchscreen is not captured by the microprocessor or stored locally on the smart payment card. The microprocessor may toggle the touchscreen between the inactive and active states.

It is an object of this disclosure to improve the functionality of smart payment cards. Specifically, it is an object of this disclosure to improve the functionality of smart payment cards so as to make the smart cards self-sufficient to make any payment, like bills. One purpose of the current disclosure is to obviate the need for smart payment cards to rely upon other devices like mobile phones, computers, point of sale devices (POS) etc., in order to make bill payment transactions.

Typically, payment cards are restricted to pay to another person using POS, and/or online mode only.

This disclosure is directed to technology which enables a debit/credit card to directly pay to another person or entity using the registered mobile number or other registered identifier (e.g., an email address) of the payment recipient. This registered mobile number may be retrieved from a cloud platform using the sender's card. Such a method of processing, and architecture associated therewith, implemented independently of a mobile/laptop/desktop device, provide great impact at least because of the reduced effort associated with the process in addition to the reduced form factor associated with the process. Such a method and apparatus may disrupt the current state of the payment technology.

Accordingly, this disclosure focuses on describing a card-based payment technology using auxiliary payment recipient identification. In some embodiments, the auxiliary identification may be obtained using cloud technology. Such a disclosed payment technology preferably enables debit/credit cards to directly download a digital phonebook/contact list from a cloud-based application or anywhere on the internet and pay any recipient on the contact list directly. Such a disclosed technology may enable cards to connect to financial institutions ("FI"). The disclosed technology may determine which FI is primarily associated with the phone number of the recipient of the funds. Then, the technology may connect to a payment gateway directly for payment.

In an embodiment, this technology preferably enhances cards by equipping them with nano-LED touch screen(s) to receive the inputs and display the notifications.

The smart payment card technology described herein preferably involves a card with a microprocessor and a nano-wireless NIC (Network Interface Card). In some embodiments, this technology involves a digital number pad. NICs will enable cards to get connected with WIFI network and initiate phone number resolution and money transfer transaction through a payment gateway. In some embodiments, payment verification technology, such as the use of micro-deposits or other suitable technology, may also be leveraged to execute transaction.

The system may include a user input system. The user input system may be in electronic communication with the microprocessor. The user input system may include a keypad or touchscreen. The user input system may include an input controller. The input controller may capture data entered using the keypad. The input controller may store the capture data locally on the smart payment card.

The user input system may include a voice controller. The voice controller may capture voice commands. The voice controller may generate an audio message confirming data captured by the input controller. The user input system may include an encryption controller. The encryption controller may encrypt data captured by the input controller and/or the voice controller.

The system may include machine executable instructions. The executable instructions may be stored in a non-transitory memory on the smart payment card.

The executable instructions, when run by the microprocessor, may self-authenticate a user of the smart payment card. Self-authentication may be based on data stored locally on the smart payment card. Self-authentication may be based on a location of the smart payment card. The self-authentication may be conducted over an established communication channel. The communication channel may be a secure communication channel linking the smart payment card and payment receiving entities.

The keypad may include mechanical keys. The keypad may include a touch sensitive screen. The touch sensitive screen may display numbers, letters or any suitable information. The user may tap the displayed information to select an entry. The touch sensitive screen may allow a user to enter data by detecting finger movement. For example, the user may use a finger to "write" numbers or letters on the touch sensitive screen. The microprocessor may translate the detected finger motion into digital data inputs.

In some embodiments, a cloud computing system may receive transaction instructions at a first time.

The cloud computing system may assign a longer or shorter time interval to transaction instructions based on a distance between a location of the smart payment card transmitting the transaction instructions and a distance from the location to one or more cloud-interaction devices.

The system may use a machine learning algorithm to appropriately identify the payment-receiving entity based on the phone number associated with the entity.

The machine learning algorithm may take into account multiple hits. For example, if the transaction instructions identify an entity, the entity may have various accounts. These accounts need to be sifted through to identify the appropriate one for payment. Legacy payment information can be leveraged to appropriately identify the correct account.

The smart payment card may include a wireless cloud-interaction interface. The executable instructions stored in a non-transitory memory may scan for a wireless cloud-interaction device communication channel.

In response to detecting the wireless cloud-interaction device communication channel, the smart payment card may transfer encrypted data from the smart payment card to the cloud-interaction device over the wireless cloud-interaction device communication channel.

The executable instructions stored on the smart payment card may purge encrypted data stored locally on the smart payment card when contact-based communication with the cloud-interaction device is not established within a predetermined time period. The cloud-interaction device may purge transaction instructions received from the smart payment card when contact-based communication was not established with the smart payment card within a predetermined time period.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes a smart payment card 101. Smart payment card 101 may alternatively be referred to herein as a "computing device." Smart payment card 101 may have dimensions up to and including 86 mm×54 mm with a thickness up to 0.8 mm. Elements of system 100, including smart payment card 101, may be used to implement various aspects of the systems and methods disclosed herein.

Smart payment card 101 may have a microprocessor 103 for controlling the operation of the device and its associated components, and may include RAM 105, ROM 107, input/output module 109, and a memory 115. The microprocessor 103 may also execute all software running on the smart payment card 101—e.g., the operating system and/or a payment application. Other components commonly used for computers, such as EEPROM or Flash memory or any other suitable components, may also be part of the smart payment card 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 along with any other data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The microprocessor 103 may execute the instructions embodied by the software and code to perform various functions.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

In an embodiment of the smart payment card 101, the microprocessor 103 may execute the instructions in all or some of the operating system 117, any applications 119 in the memory 115, and any other code embodied in hardware or firmware (not shown).

An input/output ("I/O") module 109 may include connectivity to a microphone, keyboard, LED screen, touch screen, and/or stylus through which a user of smart payment card 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown). The input and output may be related to transaction and payment resolution, authorization, and/or execution.

System 100 may be connected to other systems, computers, servers, and/or the internet via a local area network (LAN) interface 113.

System 100 may operate in a networked environment supporting connections to one or more remote computers and servers, such as terminals 141 and 151, including, in general, the internet and "cloud". References to the "cloud" in this disclosure generally refer to the internet. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers or servers that include many or all of the elements described above relative to system 100. The network connections depicted in FIG. 1 include a local area network (LAN) 125 and a wide area network (WAN) 129, but may also include other networks. Smart payment card 101 may include a NIC 126, which may include a modem 127 and LAN interface or adapter 113, as well as other components and adapters (not shown). When used in a LAN networking environment, smart payment card 101 is connected to LAN 125 through a LAN interface or adapter 113. When used in a WAN networking environment, smart payment card 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by smart payment card 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. In an embodiment, application program(s) 119 may be cloud-based applications. The various tasks may be related to transaction and payment resolution, authorization, and/or execution.

Smart payment card 101 may also include various other components, such as a battery (not shown), speaker (not shown), NIC 126, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices such as remote servers or POS kiosks.

Any information described above in connection with data 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
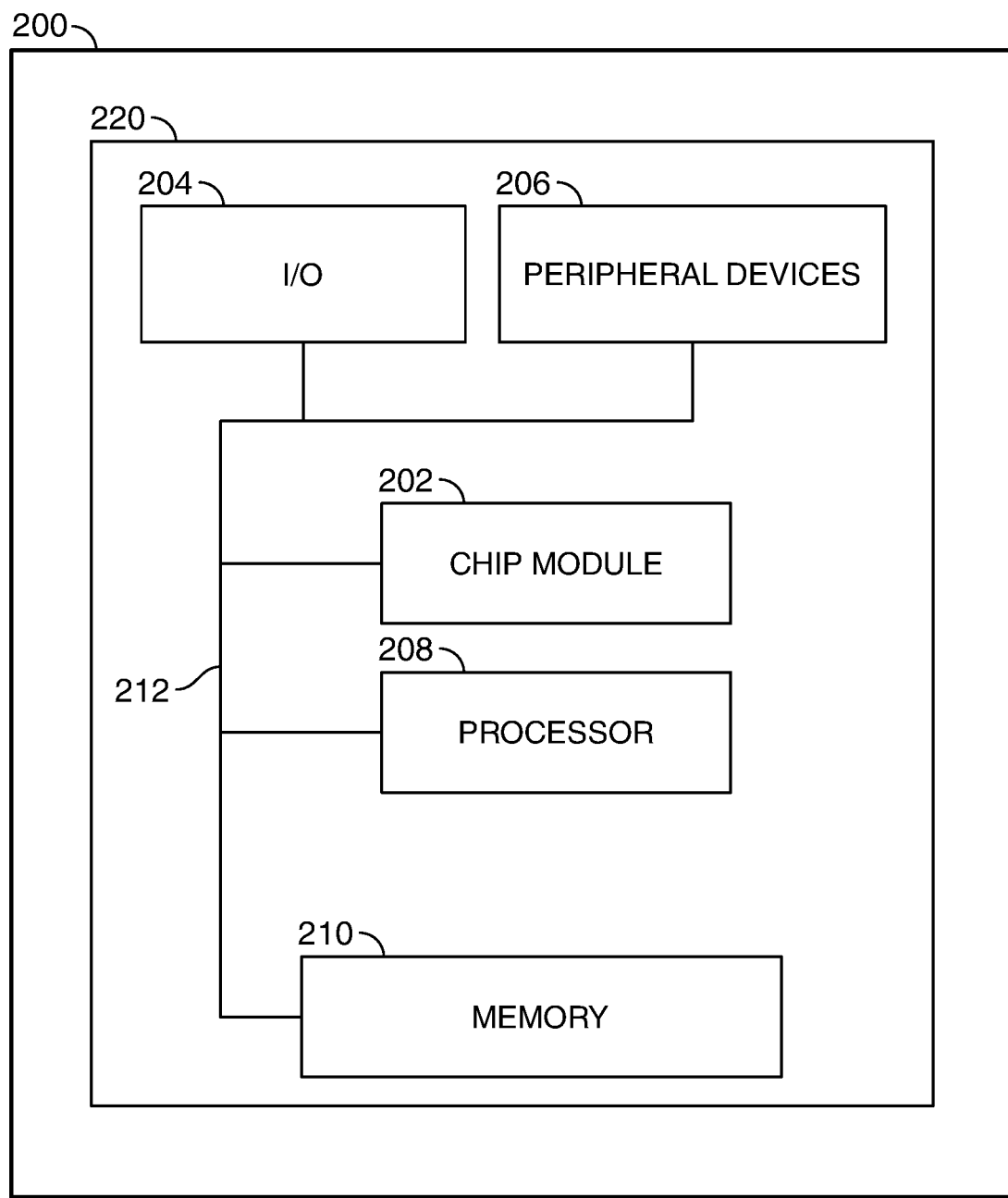
FIG. 2 shows an illustrative system in accordance with the principles of the disclosure.

FIG. 2 shows illustrative apparatus 200 that may be configured in accordance with the principles of the disclosure. Apparatus 200 may be a smart payment card. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, and LED screen, a touchscreen or any other suitable media or devices; peripheral devices 206, which may include batteries and chargers, counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
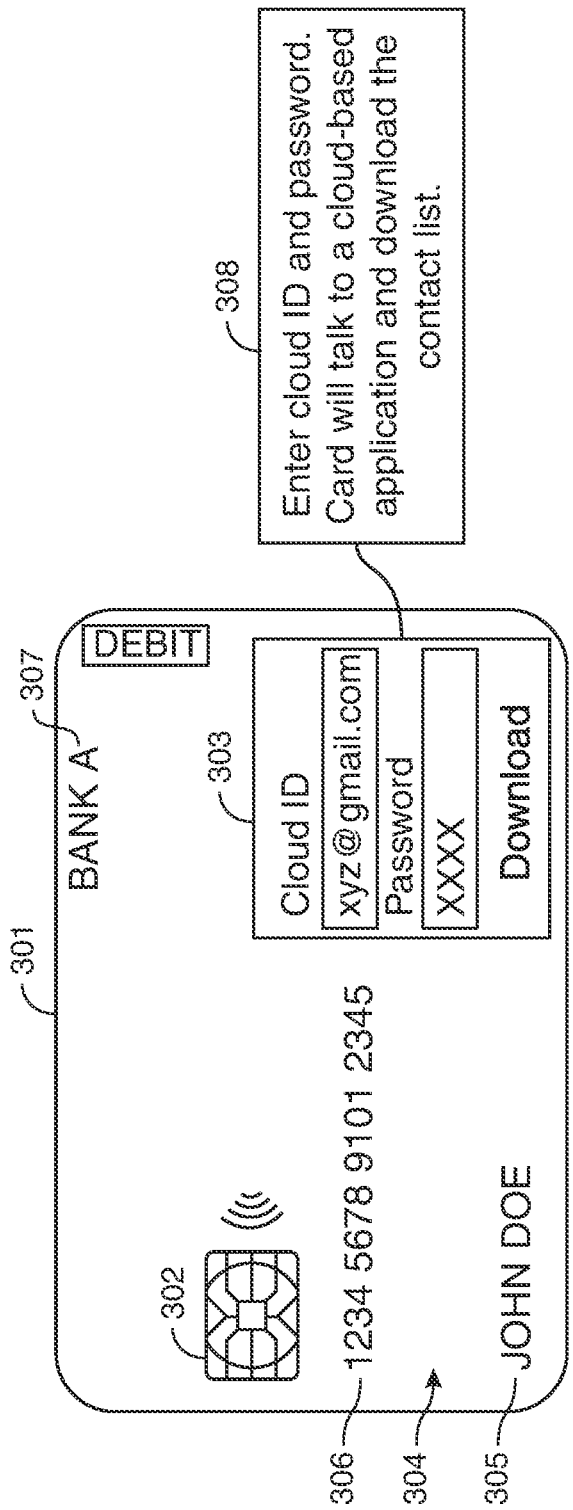
FIG. 3 shows an illustrative system in accordance with the principles of the disclosure.

FIG. 3 shows an illustrative smart payment card 301 that may be configured in accordance with the principles of the disclosure. In an embodiment, the smart payment card 301 may include a front face 304. The front face 304 may include, among other things, an issuing bank name 307, an EMV chip 302, a LED touchscreen 303, the owner/user's name 305, and a credit card number 306.

In an alternative embodiment, some, or all of these elements may appear on the back face of a smart payment card (not shown). In other embodiments, the smart payment card may not include an issuing bank name 307, the owner/user's name 305, and/or a credit card number 306.

The owner/user may activate the smart payment card 301 through an activation button (not shown), touching the touchscreen 303, performing a particular gesture utilizing an accelerometer/gyroscope, and/or speaking a particular phrase into a microphone.

Once activated, the smart payment card 301 may prompt the owner/user to enter login information on the touchscreen 303 using the touchscreen, a keypad (not shown), and/or a microphone. In addition, the smart payment card 301 may connect to the internet/cloud using an antenna (not shown) configured for, for example, Bluetooth, wi-fi, and/or cellular communications. As described in step 308, using the login information provided by the owner/user and the connection to the internet/cloud, the smart payment card may login to a cloud-based application.

In an embodiment, the cloud-based application may contain a contact list previously uploaded and/or setup by the owner/user. In addition, the cloud-based application may enable the owner/user to add names to the contact list. The entries on the contact list may be individuals or entities. In addition, a search function may be available in the cloud-based application. For example, if the owner/user is in a particular retail establishment and wishes to pay for an item through the smart payment card 301, the cloud-based application may enable the owner/user to search for the retail establishment and add it to the owner/user's contact list.

Figure 4:
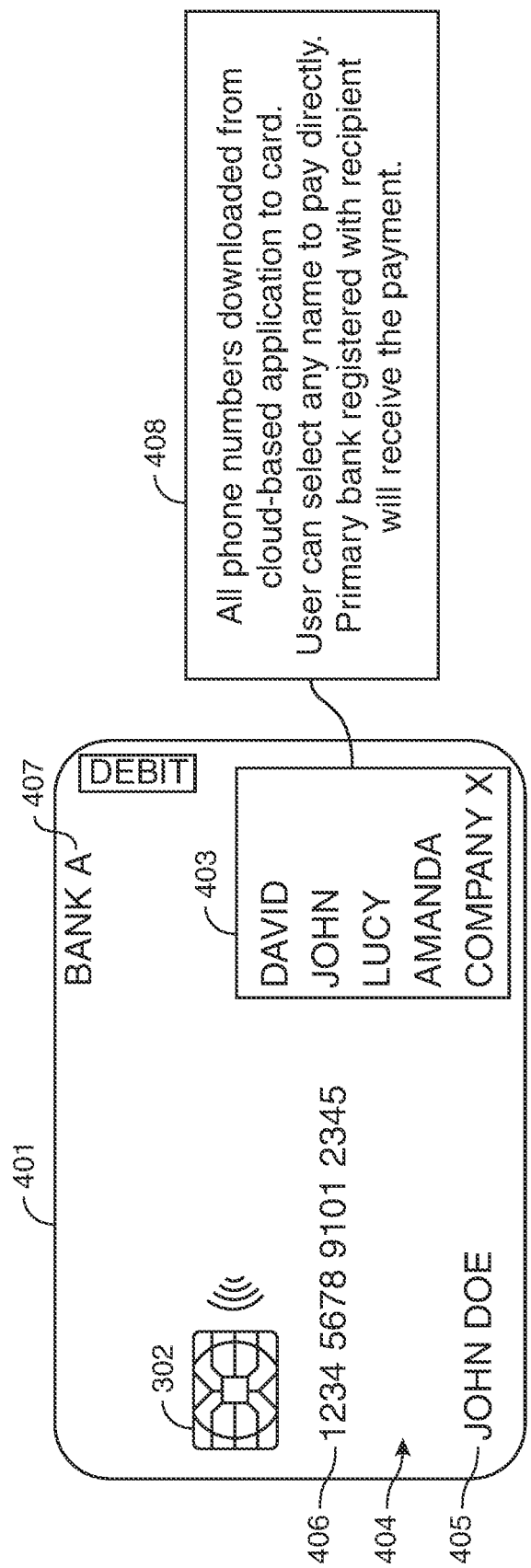
FIG. 4 shows an illustrative system in accordance with the principles of the disclosure.

FIG. 4 shows an illustrative smart payment card 401 that may be configured in accordance with the principles of the disclosure. Smart payment card 401 may have one or more features in common with smart payment card 301. In an embodiment, the smart payment card 401 may include a front face 404. The front face 404 may include, among other things, an issuing bank name 407, an EMV chip 402, a LED touchscreen 403, the owner/user's name 405, and a credit card number 406.

In an alternative embodiment, some, or all of these elements may appear on the back face of a smart payment card (not shown). In other embodiments, the smart payment card may not include an issuing bank name 407, the owner/user's name 405, and/or a credit card number 406.

As described in illustrative step 408, which follows from step 308 in FIG. 3, the smart payment card 401 may download all or part of the owner/user's contact list from a cloud-based application. Alternatively, the cloud-based application may stream the contact list instead of downloading all or part of the contact list. The smart payment card 401 may display all or a portion of the contact list on the touchscreen 403. The owner/user may then select a contact from the contact list to pay. The smart payment card and/or the cloud-based application may then use the phone number (or email address or other identifying information) associated with the recipient to resolve the recipient's financial institution information. This information may be available on the internet, through proprietary and confidential databases, and/or it may be provided by the owner/user when the contact list is created.

Once the owner/user has selected a recipient from the contact list, the smart payment card may initiate a payment from the owner/user's financial institution to the recipient's financial institution. The owner/user must provide a payment amount and the smart payment card 401 may request the owner/user provide a payment amount.

Figure 5:
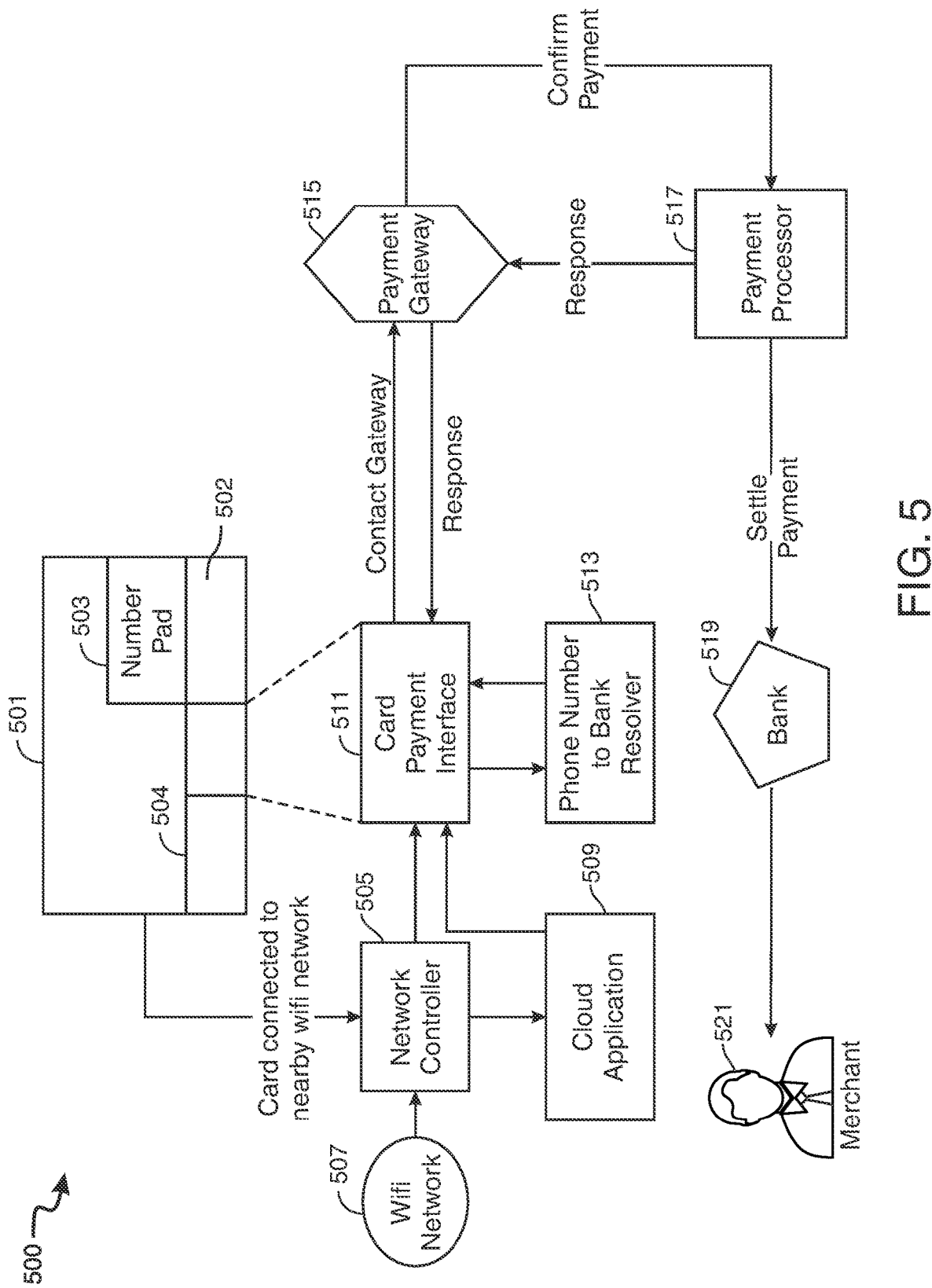
FIG. 5 shows an illustrative system and method in accordance with the principles of the disclosure.

FIG. 5 shows an illustrative diagram 500 of smart payment card 501 communicating with cloud application 509 to provide a payment to a merchant 521 in accordance with the principles of the disclosure. Smart payment card 501 may have one or more features in common with smart payment card 301 and smart payment card 401. In an embodiment, the smart payment card 501 may include a number pad 503, a microprocessor 502, a network interface card ("NIC") 504, and a card payment interface 511, along with a battery, non-transitory memory, and antennae (not shown), among other components. The NIC 504 may enable the smart payment card 501 to connect to a wi-fi network 507 through a network controller 505. In an embodiment, the wi-fi network may be a cellular network, or a LAN such as Bluetooth.

The number pad 503 may be a distinct number pad with distinct buttons, or it may appear on a touchscreen whereby the owner/user can interact with the smart payment card 501. The owner/user may utilize the number pad 503 to provide the smart payment card 501 with a payment recipient's unique identifying number (e.g., a unique phone number), the amount of the payment, a PIN number, as well as any other interaction necessary to authenticate the owner/user and complete the transaction.

In an embodiment, after connecting to a wi-fi network 507 through an internal or external network controller 505 and NIC 504, the smart payment card 501 may access a cloud-based application 509. The cloud-based application 509 may download or stream a contact list to a display on the smart payment card 501. The information retrieved from the cloud-based application 509 may appear on a card payment interface 511 on the smart payment card 501. The owner/user may be prompted to choose a recipient, such as merchant 521 from a contact list retrieved from the cloud-based application 509. Further, the owner/user may be prompted to enter a payment amount. After selecting a recipient and payment amount, the card payment interface 511, and in an embodiment, the cloud-based application 509, may communicate with a phone number to bank resolver 513. The resolver 513 may be able to determine the recipient's financial institution information so that the owner/user's payment processor 517 can transfer the payment amount to the merchant's 521 bank 519. The resolver 513 may discern the recipient's bank information through the cloud-based application 509 (e.g., when the recipient is entered into the contact list, its bank information is entered as well), through a proprietary and confidential database, through the recipient's phone number, or through any other appropriate method.

After the resolver 513 has determined the recipient's bank 519, the smart payment card 501, through the wi-fi network 507 and card payment interface 511, may contact a payment gateway 515. After the owner/user confirms the payment details, the payment gateway 515 may contact a payment processor 517. The payment processor 517 will then process the payment to the recipient/merchant 521 using the recipient's bank 519. In a preferred embodiment, the payment gateway 515 and payment processor 517 are in communication with each other and the payment gateway 515 is in communication with the smart payment card 501 through the card payment interface 511.

The payment gateway 515 and payment processor 517 may be the same or similar as current payment gateways and payment processors in use with current credit and debit cards.

Figure 6:
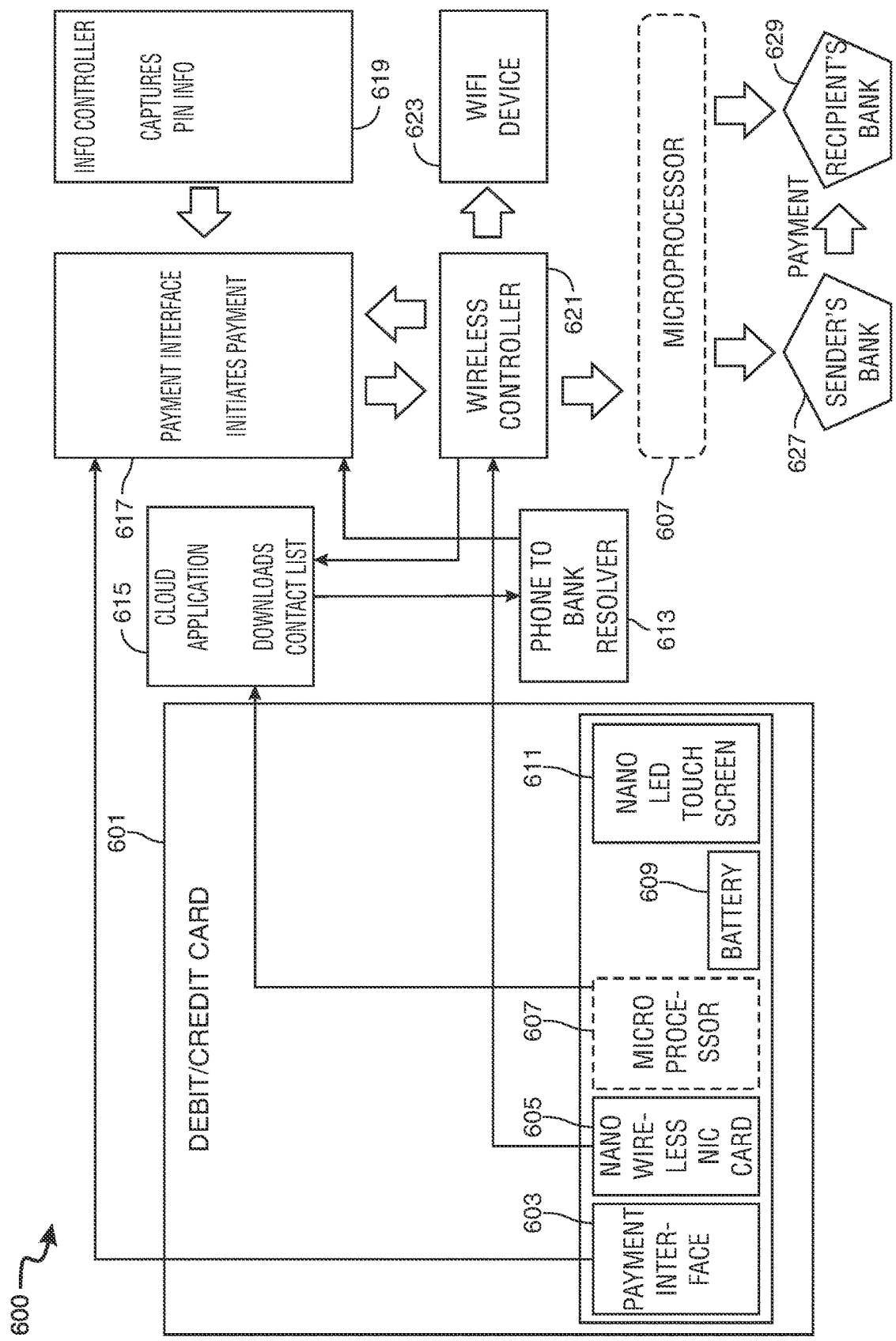
FIG. 6 shows an illustrative system and method in accordance with the principles of the disclosure.

FIG. 6 shows an illustrative diagram 600 of smart payment card 601 communicating with cloud application 615 to provide a payment to recipient bank 629 in accordance with the principles of the disclosure. Smart payment card 601 may have one or more features in common with smart payment card 301, smart payment card 401, and smart payment card 501. In an embodiment, the smart payment card 601 may include a payment interface 603, a microprocessor 607, NIC 605, a battery 609, a touchscreen 611, along with non-transitory memory and antennae (not shown), among other components. The NIC 605 may enable the smart payment card 601 to connect to a wi-fi device 623 through an external or internal wireless network controller 621. In an embodiment, the wi-fi network may be a cellular network, or a LAN such as Bluetooth.

Through the wireless controller 621 and microprocessor 607, the smart payment card 601 may communicate with a cloud-based application 615 and download a contact list. The contact list may also be streamed to the smart payment card 601 instead of downloaded in full. The microprocessor 607 may then display the contact list on the touch screen 611. The owner/user, through the payment interface 603 and touch screen 611, may then choose a recipient for a payment from the contact list provided by the cloud-based application. The owner/user may also choose a payment amount through the payment interface 603 and touch screen 611.

In an embodiment, the owner/user and his payment decisions may be authenticated by an information controller 619 which captures and authenticates a PIN or other identifying action.

The cloud-based application 615 may communicate with a bank resolver 613. The bank resolver 613 may resolve (i.e., determine) the recipient's financial institution information and resolve the identity of the recipient's bank 629. The bank resolver 613 may discern the recipient's bank 629 information through the cloud-based application 615 (e.g., when the recipient is entered into the contact list, its bank information is entered as well), through a proprietary and confidential database, through the recipient's phone number, or through any other appropriate method.

In an embodiment, after the bank resolver 613 has determined the recipient's bank 629 and the payment information has been authenticated by the information controller 619, the payment interface 603 may communicate with the wireless controller 621 and microprocessor 607. The payment interface 603 may perform the step 617 of initiating a payment from the owner/user's bank 627 to the recipient's bank 629. The recipient's bank 629 may then follow its own protocols in disbursing the payment to the recipient.

Figure 7:
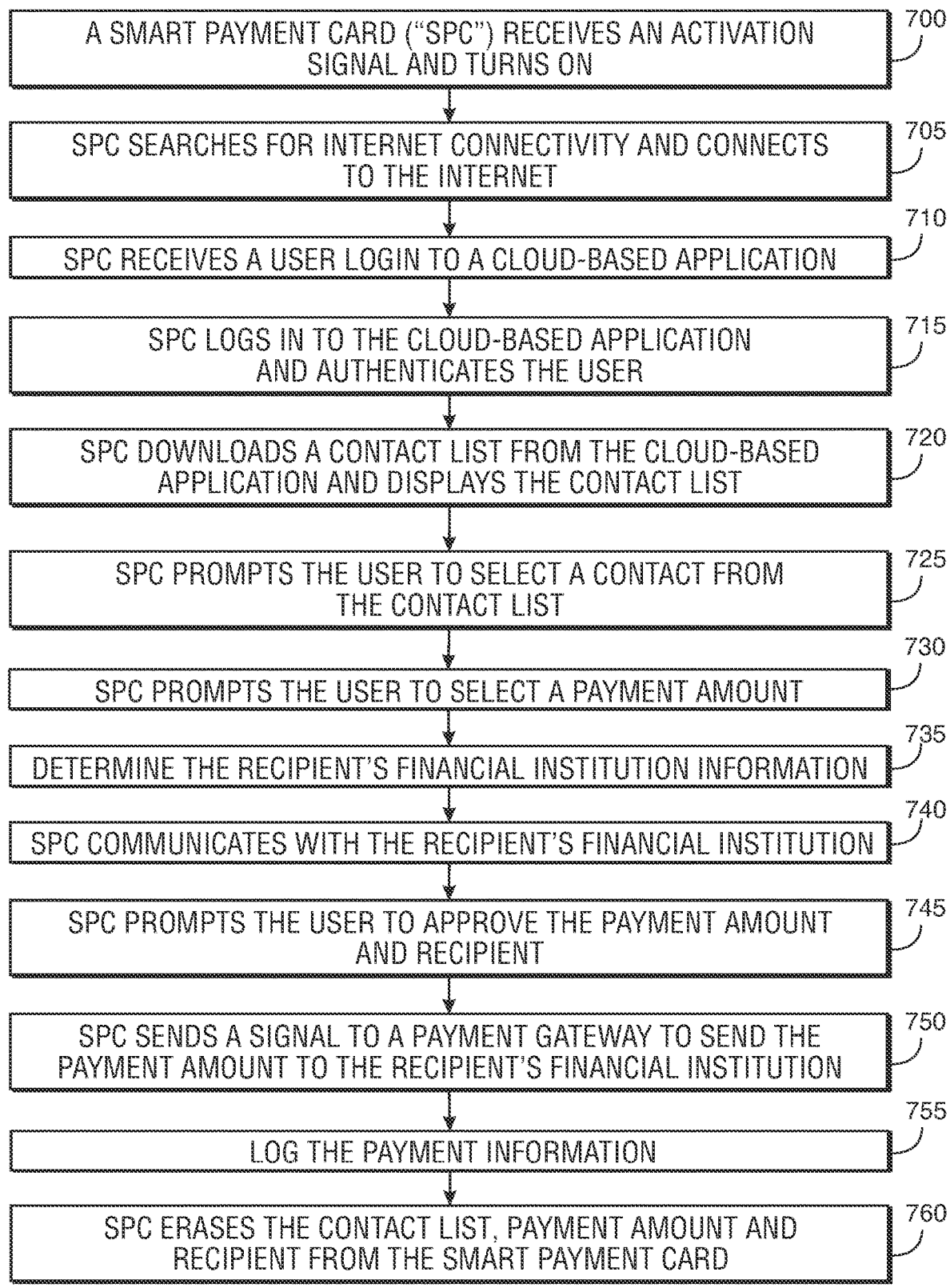
FIG. 7 shows an illustrative flowchart of a method in accordance with the principles of the disclosure.

FIG. 7 shows an illustrative method in accordance with the principles of the disclosure. Methods may include some or all of the method steps 700-760. Methods may include the steps illustrated in FIG. 7 in an order different from the illustrated order. The illustrative method shown in FIG. 7 may include one or more steps performed in FIG. 5 or FIG. 6, or described herein.

At step 700, a smart payment card in accordance with the disclosure may receive an activation signal and turn on (i.e., activate). At step 705, the smart payment card may search for internet connectivity and connect to the internet. The smart payment card may use Bluetooth, wi-fi, cellular technology, or any other viable internet connectivity technology, to connect to the internet.

At step 710, the smart payment card may receive login credentials from a user or owner of the card. The login credentials may be directed to a cloud-based application. At step 715, the smart payment card may login to a cloud-based application using the login credentials provided in step 710. The card may also authenticate the user/owner using the login credentials or some other credential (e.g., a PIN).

At step 720, after logging into the cloud-based application, the smart payment card may download a contact list from the cloud-based application. The card may then display the contact list on a screen or touchscreen located on one face of the smart payment card. The contact list may be downloaded in whole or in part, and may be streamed instead of downloaded.

At step 725, the smart payment card may prompt the user/owner to select one contact from the contact list to be a recipient. At step 730, the smart payment card may prompt the user to select or input a payment amount. This payment amount would be the payment amount the user/owner desires to pay the contact/recipient selected at step 725.

At step 735, the smart payment card, through the cloud-based application and/or a bank resolver, may determine the recipient's financial institution information. The card/bank resolver may discern the recipient's bank information through the cloud-based application (e.g., when the recipient is entered into the contact list, its bank information is entered as well), through a proprietary and confidential database, through the recipient's phone number, or through any other appropriate method.

At step 740, the smart payment card may communicate with the recipient's financial institution. This communication may take the form of a confirmation that the correct institution has been located. The communication may also take the form of setting up and initiating a transfer of funds from the owner/user to the recipient. Other communications may also be necessary or prudent.

At step 745, the smart payment card may prompt the user/owner to confirm and approve the details of the requested transaction, such as payment amount and recipient. If the details are confirmed and approved, at step 750, the smart payment card may then send the requested payment amount to the recipient's financial institution.

At step 755, the smart payment card may log the payment transaction. The log may be on the smart payment card, it may be sent to the user/owner's financial institution, and/or it may be logged on the internet (e.g., with the cloud-based application). This log may be meant to create a record, searchable or not, of payment transactions. This record may protect the owner/user and the owner/user's financial institution from fraud and allegations of fraud.

Finally, at step 760, the smart payment card may erase the contact list and payment details (such as payment amount and recipient) from the smart payment card. The smart payment card may not erase the log created at step 755, if that log is located on the smart payment card. When step 760 is performed, the owner/user will have to start the method over from step 700 in order to make any additional payments. In an alternative embodiment, some or all of this information is not erased and the owner/user may be able to set up consistent and/or recurring payments (e.g., to pay a monthly cell phone bill). In an alternative embodiment, some or all of this information is not erased and the owner/user may be able to make successive payments to one or more recipients without redownloading or streaming the contact list.

Thus, systems and methods for a smart payment card using cloud-based application(s) have been provided. Persons skilled in the art will appreciate that the present invention can be practiced by other than the described embodiments, which are presented for purposes of illustration rather than of limitation.

What is claimed is:

1. A smart payment card having a thickness not greater than 0.8 millimeters ("mm") and a surface area not greater than 86 mm×54 mm, said smart payment card comprising:
   a substantially rectangular housing with a right edge, a left edge, a top edge, a bottom edge, a front face, and a back face;
   a microprocessor embedded in the housing;
   non-transitory memory embedded in the housing and electronically coupled to the microprocessor;
   a network interface controller embedded in the housing and electronically coupled to the microprocessor;
   an input/output module embedded in the housing and electronically coupled to the microprocessor;
   at least one screen embedded in the housing configured to be visible and electronically coupled to the microprocessor;
   a display controller embedded in the housing and electronically coupled to the microprocessor and to the screen;
   at least one antenna embedded in the housing and electronically coupled to the microprocessor;
   an electrical contact embedded in the housing and electronically coupled to the microprocessor;
   a battery electronically coupled to the electrical contact for powering the at least one antenna, the display controller, the screen, the input/output module, the network interface controller, the non-transitory memory, and the microprocessor;
   an operating system stored in the non-transitory memory configured to, at least, connect to at least one cloud-based payment application, said at least one cloud-based payment application configured to access an internet-based contact list comprising at least one pre-approved contact, to resolve via said contact's financial institution information, and to instruct a financial institution associated with the user to direct a monetary payment to said contact; and
   wherein the smart payment card can only direct the monetary payment through the at least one cloud-based payment application.

2. The smart payment card of claim 1 wherein the screen is a touchscreen.

3. The smart payment card of claim 1 further comprising a biometric scanner to authenticate the identity of the user located within the housing and at least electronically coupled to the microprocessor and powered by the battery.

4. The smart payment card of claim 1 wherein the antenna is a Bluetooth antenna.

5. The smart payment card of claim 1 wherein the antenna is a cellular antenna.

6. The smart payment card of claim 1 wherein the antenna is a wi-fi antenna.

7. The smart payment card of claim 1 further comprising a Near Field Communication chip electronically coupled to at least the microprocessor and powered by the battery.

8. The smart payment card of claim 1 wherein the pre-approved contact is a pre-approved invoice.

9. The smart payment card of claim 1 wherein the microprocessor has a thickness between 0.0001 mm and 0.25 mm.

10. The smart payment card of claim 1 wherein the input/output module further comprises a keypad configured to be accessible to a user.

11. The smart payment card of claim 1 wherein the input/output module further comprises a microphone.

12. The smart payment card of claim 1 further comprising an encryption controller.

13. The smart payment card of claim 12 wherein the non-transitory memory further comprises executable instructions and at least one datum configured to authenticate the user.

14. A method of using a smart payment card to make a payment using internet-based information, said method comprising:
   receiving an activation signal at the smart payment card;
   connecting the smart payment card to the internet;
   receiving a user login, said login enabling a download from a cloud-based application, said download comprising at least a list of registered pre-approved vendor contacts and pre-approved invoices;
   authenticating the user;
   downloading at least a portion of the list onto the smart payment card;
   prompting the user to select a recipient or invoice from the list;
   receiving an indication of the payment amount from the user;
   determining, via a resolver, the recipient's bank account information or bank account information connected with the invoice;
   communicating with the user's financial institution;
   approving the payment amount;
   sending the payment amount to the recipient's bank account or bank account connected with the invoice;
   logging the payment amount and recipient or invoice;
   erasing the contact list, payment amount, and recipient from the smart payment card; and
wherein the smart payment card can only send the payment to a pre-approved vendor contact or a pre-approved invoice located on the list.

15. The method of claim 14, wherein the smart payment card comprises:
   a substantially rectangular housing with a right edge, a left edge, a top edge, a bottom edge, a front face, and a back face;
   a microprocessor embedded in the housing;
   non-transitory memory embedded in the housing and electronically coupled to the microprocessor;
   a network interface controller embedded in the housing and electronically coupled to the microprocessor;
   an input/output module embedded in the housing and electronically coupled to the microprocessor;
   at least one screen embedded in the housing configured to be visible and electronically coupled to the microprocessor;
   a display controller embedded in the housing and electronically coupled to the microprocessor and to the screen;
   at least one antenna embedded in the housing and electronically coupled to the microprocessor;
   an electrical contact embedded in the housing and electronically coupled to the microprocessor;
   a battery electronically coupled to the electrical contact for powering the at least one antenna, the display controller, the screen, the input/output module, the network interface controller, the non-transitory memory, and the microprocessor;
   an operating system stored in the non-transitory memory configured to, at least, connect to at least one cloud-based payment application, said at least one cloud-based payment application configured to access an internet-based contact list comprising at least one pre-approved contact, to resolve via a resolver said contact's financial institution information, and to instruct a financial institution associated with the user to direct a monetary payment to said contact; and wherein the smart payment card can only direct the monetary payment through the at least one cloud-based payment application.

16. The method of claim 14 wherein the smart payment card is connected to the internet through cellular data.

17. The method of claim 14 wherein the smart payment card is connected to the internet through wi-fi.

18. A method of using a smart payment card to make a payment using internet-based information, said method comprising:

receiving an activation signal at the smart payment card;

connecting the smart payment card to the internet;

receiving a user login, said login enabling a stream from a cloud-based account, said stream comprising at least a list of registered pre-approved vendor contacts and pre-approved invoices;

authenticating the user;

streaming at least a portion of the list onto the smart payment card;

prompting the user to select a recipient or invoice from the contact list;

receiving an indication of the payment amount from the user;

determining the recipient's bank account information;

communicating with the user's financial institution;

approving the payment amount;

sending the payment amount to the recipient's bank account;

logging the payment amount and recipient;

erasing the contact list, payment amount, and recipient from the smart payment card; and wherein the smart limited transaction payment card can only send the payment to a pre-approved vendor contact or a pre-approved invoice located on the list.

19. The method of claim 17 wherein the smart payment card is connected to the internet through cellular data.

20. The method of claim 17 wherein the smart payment card is connected to the internet through wi-fi.

* * * * *